(12) United States Patent
Noh et al.

(10) Patent No.: US 7,742,216 B2
(45) Date of Patent: Jun. 22, 2010

(54) ELECTRO-CHROMIC DISPLAY DEVICE AND METHOD OF MANUFACTURING THE SAME

(75) Inventors: Chang Ho Noh, Suwon-si (KR); Sung Hen Cho, Seoul (KR); Ki Yong Song, Seoul (KR); Tae Rim Choi, Seoul (KR); Tamara Byk, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 136 days.

(21) Appl. No.: 11/851,005

(22) Filed: Sep. 6, 2007

(65) Prior Publication Data

US 2008/0186564 A1    Aug. 7, 2008

(30) Foreign Application Priority Data

Feb. 2, 2007    (KR) .................. 10 2007 0011145

(51) Int. Cl.
*G02F 1/15* (2006.01)
*G02F 1/00* (2006.01)
*G02F 1/03* (2006.01)

(52) U.S. Cl. .................. 359/265; 359/270; 359/273; 359/245; 359/321; 359/322; 359/296; 252/582; 252/583; 252/586

(58) Field of Classification Search ................. 359/265, 359/245, 270, 273–275, 296, 321, 322; 252/582, 252/583, 586; 428/315.5, 411.1, 469, 702, 428/704

See application file for complete search history.

(56) References Cited

U.S. PATENT DOCUMENTS

| | | | |
|---|---|---|---|
| 4,252,418 A | 2/1981 | Barclay et al. | |
| 6,067,184 A | 5/2000 | Bonhote et al. | |
| 6,426,827 B1 | 7/2002 | Bonhote et al. | |
| 6,441,942 B1 * | 8/2002 | Branz et al. | 359/265 |
| 6,605,239 B2 * | 8/2003 | Fitzmaurice et al. | 252/583 |
| 6,734,305 B2 | 5/2004 | Pierre et al. | |
| 6,870,657 B1 * | 3/2005 | Fitzmaurice et al. | 359/273 |
| 7,253,940 B2 * | 8/2007 | Fitzmaurice et al. | 359/265 |
| 7,256,925 B2 * | 8/2007 | Noh et al. | 359/265 |
| 7,358,358 B2 * | 4/2008 | Fitzmaurice et al. | 544/38 |
| 7,450,292 B1 * | 11/2008 | Burrell et al. | 359/270 |

FOREIGN PATENT DOCUMENTS

| | | |
|---|---|---|
| KR | 19980009422 | 4/1998 |
| KR | 1020020062286 | 7/2002 |
| KR | 1020030067226 A | 8/2003 |
| KR | 1020060088152 A | 8/2006 |
| WO | 9530495 A1 | 11/1995 |
| WO | 97/35227 A2 | 9/1997 |
| WO | 97/35227 A3 | 9/1997 |
| WO | 9835267 A1 | 8/1998 |
| WO | 01/27690 A2 | 4/2001 |
| WO | 01/27690 A3 | 4/2001 |
| WO | 2004/067673 A1 | 8/2004 |
| WO | 9735227 A2 | 2/2008 |

\* cited by examiner

*Primary Examiner*—Loha Ben
(74) *Attorney, Agent, or Firm*—Cantor Colburn LLP

(57) ABSTRACT

Disclosed herein is an electrochromic display device comprising a pair of transparent substrates facing each other, an anode electrode and a cathode electrode respectively formed on the transparent substrates, an electrolytic layer disposed between the anode electrode and the cathode electrode, an electrochromophore layer of a nano structure formed on at least one of the anode electrode and the cathode electrode, and a redox promoter layer coated with a conductive compound, on the other electrode.

20 Claims, 5 Drawing Sheets

ELECTRO-CHROMIC DISPLAY DEVICE AND METHOD OF MANUFACTURING THE SAME

CROSS-REFERENCE TO RELATED APPLICATIONS

This application claims priority under 35 U.S.C. §119(a) to Korean Patent Application No. 10-2007-0011145, filed on Feb. 2, 2007, in the Korean Intellectual Property Office, the entire contents of which are hereby incorporated by reference.

BACKGROUND OF THE INVENTION

1. Field of the Invention

The present invention relates to an electrochromic display device and a method of manufacturing the same, and more particularly, to a method of manufacturing an electrochromic device, in which the manufacturing process steps are simplified in order to significantly improve the manufacturing process efficiency. Also provided is an electrochromic device characterized by excellent driving properties with regard to both memory properties and response properties.

2. Description of the Related Art

Generally, electrochromic display systems are based on the color variations that occur in various types of metal oxides, and organic or inorganic compounds, resulting from electrochemical reactions, particularly oxidation-reduction reactions.

An electrochromic device typically has a sandwich type structure. The electrochromic device generally comprises two glass substrates one, on each outer side; a counter electrode and a working electrode disposed between the glass substrates; an electrochromic material; and an electrolytic solution enabling the permeation of ions.

As an example, an electrochromic device can be manufactured in such a manner that a nanocrystal semiconductor material is layered onto a cathode, and the electrochromic material is subsequently adsorbed onto the nanocrystal semiconductor layer. In addition, a metal layer that can be reversibly oxidized is arranged on an anode. This electrochromic device has disadvantages in that the electrochromatic device has a slow response speed, and it does not have sufficient memory properties.

In another example, an electrochromic device can be manufactured in such a manner that the cathode is constructed as described above and an electrochromic compound, having a p-type oxidation-reduction promoter, is adsorbed onto the nanocrystal semiconducting layer on the cathode. This electro-chromic device is advantageous in that it has a fast response speed and enhanced memory properties. However, this electro-chromic device still has problems in that it is difficult to synthesize an oxidation-reduction chromophore compound, which can be adsorbed into a nanocrystal semiconductor material. In addition, the manufacturing process steps of such a device are complex.

SUMMARY OF THE INVENTION

In one embodiment, the present invention provides an electrochromic display device possessing excellent driving properties, such as memory properties and response properties, and also possessing simplified manufacturing process steps which significantly improve the manufacturing process efficiency.

In another embodiment, the present invention also provides a method of manufacturing an electrochromic display device, in which the manufacturing process steps of the electrochromic display device are simplified.

According to one aspect of the present invention, there is provided an electrochromic display device comprising a pair of transparent substrates facing each other, an anode electrode and a cathode electrode respectively formed on the transparent substrates, an electrolytic layer disposed between the anode electrode and the cathode electrode, and an electrochromophore layer comprising a nano structure formed on at least one of the anode electrode and the cathode electrode.

According to another aspect of the present invention, there is provided a method for manufacturing an electrochromic display device wherein the method comprises forming an anode electrode and a cathode electrode on a transparent substrate, disposing an electrolytic layer between the anode and the cathode, and further forming an electrochromophore layer by coating a conductive compound, which is a redox promoter, on at least one of the anode electrode and the cathode electrode.

BRIEF DESCRIPTION OF THE DRAWINGS

The above and/or other aspects and advantages will become apparent and more readily appreciated from the following detailed description, taken in conjunction with the accompanying drawings, of which.

DETAILED DESCRIPTION OF THE INVENTION

Figure 1:
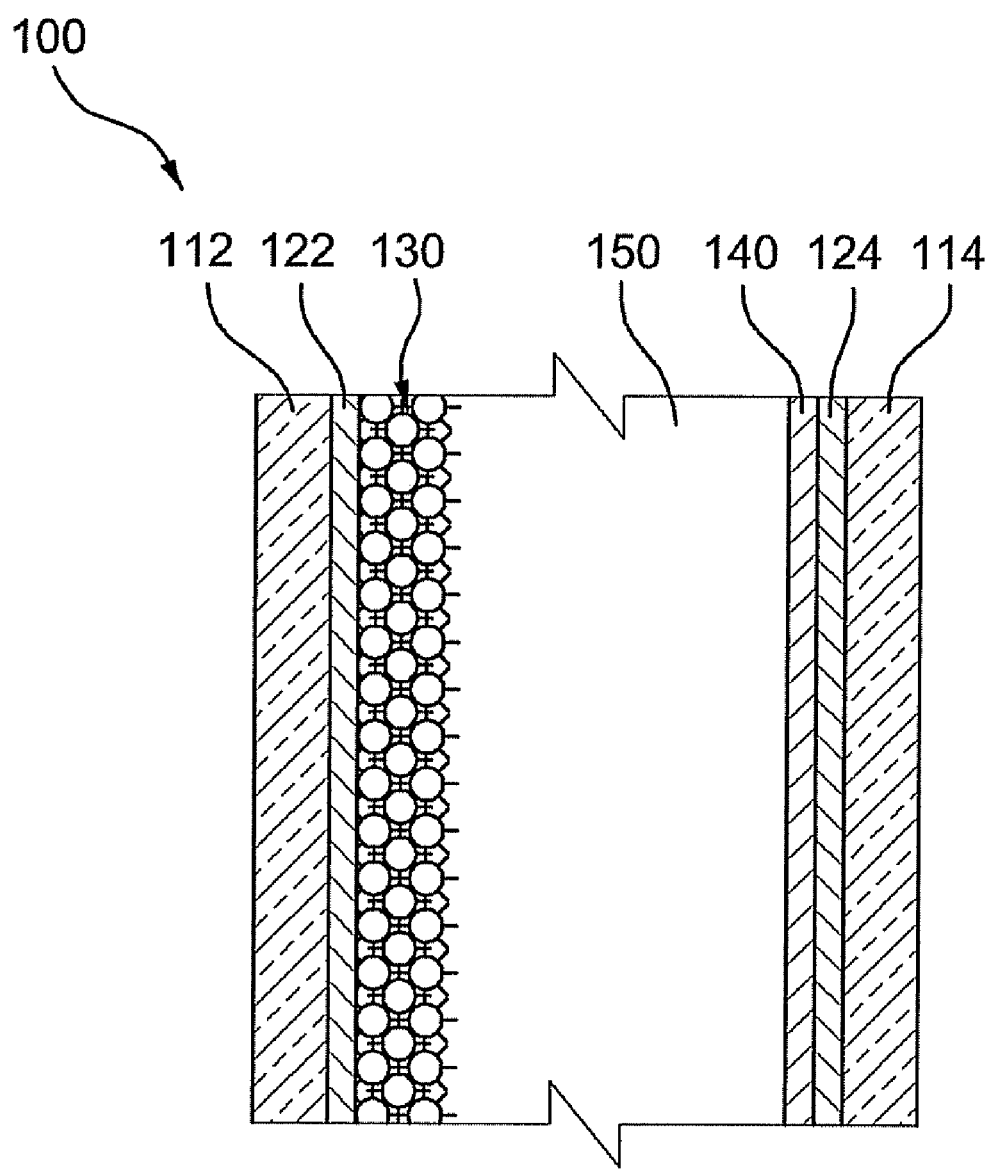
FIG. 1 is an exemplary embodiment of a cross-sectional view schematically illustrating an electrochromic display device.

Hereinafter, exemplary embodiments of the present invention will be explained in more detail with reference to the accompanying drawings, wherein like reference numerals refer to the like elements throughout It will be understood that when an element or layer is referred to as being "on," "interposed," "disposed," or "between" another element or layer, it can be directly on, interposed, disposed, or between the other elements or layers or, intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one embodiment, an electrochromic display device includes a first substrate, a second substrate, a cathode electrode, an anode electrode, an electrochromophore layer, a p-type redox promoter layer 1, and an electrolytic layer.

FIG. 1 is an exemplary embodiment of a cross-sectional view schematically illustrating an electrochromic display device 100. The first substrate 112, the cathode electrode 122, and the electrochromophore layer 130, are arranged to face the second substrate 114, the anode electrode 124, and the p-type redox promoter layer 140, and the electrolytic layer 150 is interposed there between. In a preferred embodiment, the first substrate 112, the cathode electrode 122, and the electro-chromophore layer 130, are arranged to respectively correspond to the second substrate 114, the anode electrode 124, and the p-type redox promoter layer 140.

In another embodiment, the first substrate 112 and the second substrate 114 are made of a transparent material. The transparent material used for the first substrate 112 and the second substrate 114 may also be a flexible material. Suitable examples of transparent substrates include, one or more selected from the group consisting of transparent inorganic substrates such as glass, silicon oxide, surface modified glass, epoxy/glass fiber composites, and transparent plastic substrates, such as polyethylene terephthalate ("PET"), polyethylene naphthalate ("PEN"), polycarbonate, polystyrene, polypropylene, polymethylmethacrylate, and the like; and a combination comprising at least one of the foregoing transparent substrates.

In another embodiment, the cathode electrode 122 is formed on the first substrate 112, and the anode electrode 124 is formed on the second substrate 114. The cathode electrode 122 and the anode electrode 124 are transparent electrodes. Suitable examples of conductive materials that can be used for the transparent electrodes include one or more selected from the group consisting of indium tin oxide ("ITO"), tin oxide ("TO"), fluorine-doped tin oxide (FTO), $Al_2O_3$, $SnO_2$—$Sb_2O_3$, and, a combination of one or more of the foregoing conductive materials. Transparent conductive polymers may also be used to form the transparent electrodes.

Suitable examples of intrinsically conductive polymers ("ICP"s) or ICP precursors are polyaniline, substituted polyanilines, polypyrroles, polythiophenes, substituted polythiophenes, polyacetylenes, poly(ethylenedioxythiophene)s, poly(p-phenylene vinylene)s, polycarbozoles, polyindoles, or the like, or combinations comprising at least one of the foregoing ICPs. The ICPs and. or the ICP precursors may be copolymerized with non-electrically conducting oligomers or polymers selected from the group consisting of polymethylmethacrylates, polyacrylates, polyamides, polyesters, polyimides, polyethers, polyolefins, polyetherketones, polyether ether ketones, polyether ketone ketones, polycarbonates, polyarylene ethers, epoxies, polysulfones, polyethersulfones, polyetherimides, polynorbornylene, polysiloxanes, polyvinylchlorides, fluoropolymers, liquid crystalline polymers, ionomers, or the like, and a combination comprising at least one of the foregoing polymers.

In yet another embodiment, the cathode electrode 122 and the anode electrode 124 may have various pattern shapes depending on the purpose of use, and the types of display images present in the display device 100. For example, the cathode electrode 122 and the anode electrode 124 may comprise matrix shaped patterns.

According to one embodiment, the cathode electrode 122 and the anode electrode 124 form an electric field inside the electrochromic display device when an electric charge is applied to the device.

Figure 2:
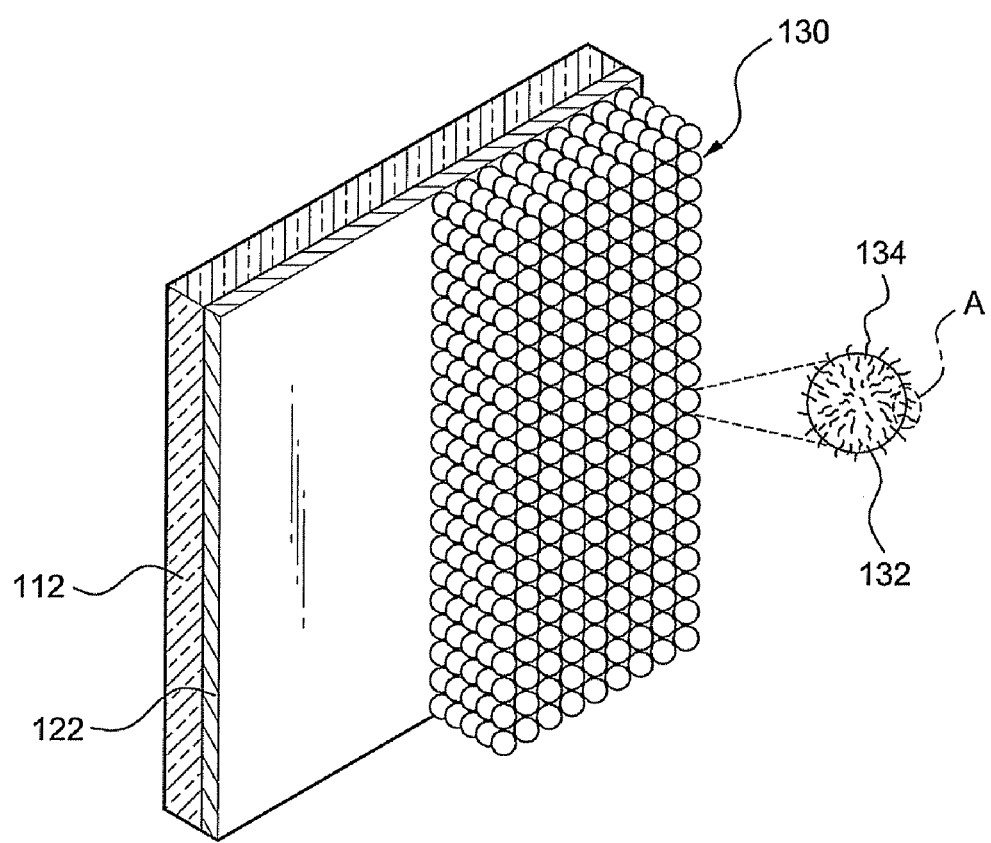
FIG. 2 is an exemplary embodiment of a perspective view illustrating the electrochromophore layer of FIG. 1.

According to another embodiment, a nanocrystal layer comprising a nano structure, and the electrochromophore layer 130, are both formed on the cathode electrode, wherein the electrochromophore layer 130 comprises a n-type redox chromophore compound adsorbed onto the nanocrystal layer. FIG. 2 is an exemplary embodiment of a perspective view illustrating the electro-chromophore layer of FIG. 1. Referring to FIG. 2, the nanocrystal layer is formed in such a manner that a plurality of nanocrystal particles 132, having a nano sized globular shape, are layered on the cathode electrode 122 such that a thin film is formed.

According to yet another embodiment, a plurality of n-type redox chromophore compounds are adsorbed onto the nanocrystal particles 132. Preferably, organic electrochromatic material based compounds, such as viologen, are used as the n-type redox chromophore compounds.

Reaction 1 illustrates an electrochemical reaction of a general viologen compound.

[Reaction 1]

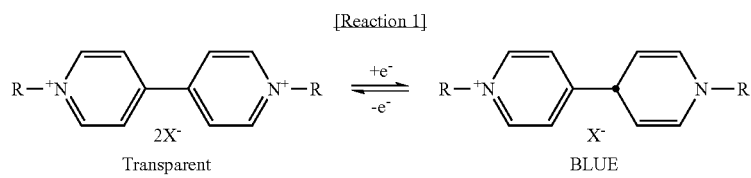

Figure 3:
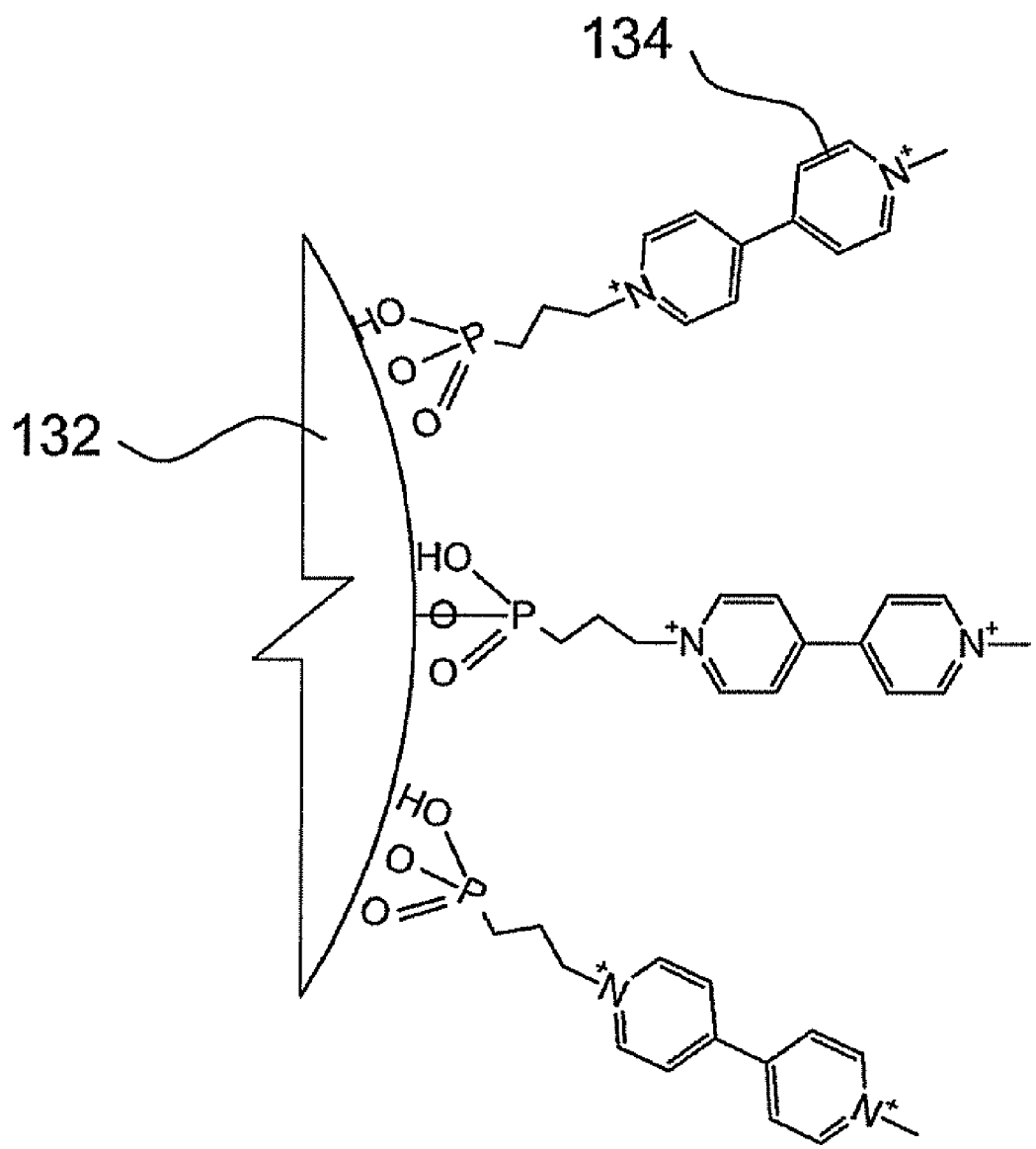
FIG. 3 is a partially enlarged view illustrating a portion A of FIG. 2.

The viologen compound undergoes reduction to express a blue color and is returned to the transparent state by the reverse electric field. Metal oxides such as $TiO_2$ or, an inorganic compound, may also be used as the nanocrystal particles 132. FIG. 3 is a partially enlarged view illustrating a portion A of FIG. 2. In FIG. 3, a viologen 134 having a propyl phosphate group at one end is used as the n-type redox chromophore compound 134. The propyl phosphate group is the portion of the molecule that is substantially adsorbed onto the nanocrystal particles 132.

In one embodiment, a compound having a carboxyl group, a salicylic group, and an ethyphosphate group at the end, such as viologen, may be used as the organic electrochromatic material 134. Although the viologen compound 134 has been described in the art, the present invention is not limited to the viologen compound. In particular, various types of n-type redox chromophore compounds may be used and may be selected based upon the purpose for which the display device 100 will be used.

In another embodiment, the n-type redox chromophore compounds may be formed over the nanocrystal particles using methods such as spin coating, ink-jet printing, roll coating, doctor blading, spray coating, and the like.

Accordingly, since there is no need to adsorb the redox promoter onto the aforementioned nanocrystal particles, it is possible to simplify the process steps required for manufacturing the electrochromatic display device 100 and, to additionally reduce the time and the cost associated with the synthesis of the conductive compound.

When the thickness of the redox promoter layer 140 is less than about 0.1 μm, the memory properties may be severely degraded. By contrast, when the thickness of the redox promoter layer 140 is greater than about 10 μm, the efficiency of the manufacturing process may be compromised.

According to another embodiment, the thickness of the p-type redox promoter layer 140 is preferably in the range of about 0.1 μm to about 10 μm, more preferably in the range of about 0.2 μm to about 3 μm.

According to yet another embodiment, a conductive polymer compound may be used as the p-type redox promoter compound. Further, a ferrocene-containing conductive polymer may be used as the conductive polymer compound.

A new conductive polymer compound represented by the following Chemical Formula 1, developed by the Samsung Advanced Institute of Technology, may be used as the ferrocene-containing conductive polymer.

[Chemical Formula 1]

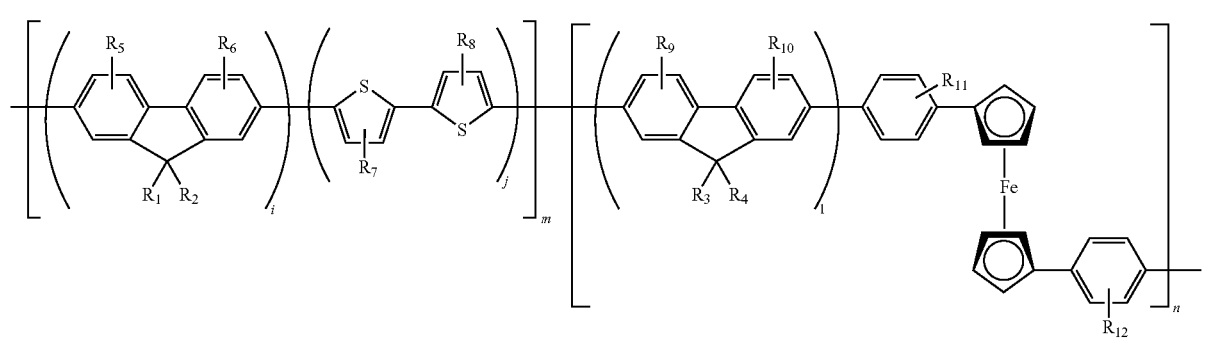

Referring to FIG. 1 again, the p-type redox promoter layer 140, coated with a conductive compound, is disposed on the anode electrode 124. According to one embodiment, the conductive compound is the p-type redox promoter. Thus, the p-type redox promoter layer 140 comprises a p-type redox promoter compound. The p-type redox promoter layer 140 can be formed easily only through the use of coating methods. Suitable examples of coating methods include one or more selected from the group consisting of spin coating, spray coating, electrostatic coating, deep coating, blade coating, roll coating, inkjet printing, and a combination of one or more of the forgoing coating methods.

In Chemical Formula 1, $R_1$, $R_2$, $R_3$, $R_4$, $R_5$, $R_6$, $R_7$, $R_8$, $R_9$, $R_{10}$, $R_{11}$ and $R_{12}$ are equal to or different from one another, and are selected from among H; an alkyl group having the number of C atoms in the range of about 1 to about 20; an alkoxy group having the number of C atoms in the range of about 1 to about 20; a cycloalkyl group having the number of C atoms in the range of about 3 to about 20; a heterocycloalkyl group having the number of C atoms in the range of about 3 to about 20; an allyl group having the number of C atoms in the range of about 5 to about 30; a heteroallyl group having the number of C atoms in the range of about 5 to about 36; an allylalkyl group having the number of C atoms in the range of about 7 to about 30; or an allyloxyl group having the number of C atoms in the range of about 5 to about 30. Further, i and j are equal to or different from each other and are not zero, wherein i is an integer between 0 and about 30, and j is an integer between 0 and about 30 l is a natural number between about 1 and about 30; m and n are equal to or different from each other and are not zero wherein m is an integer between 0 and about 200, and n is an integer between about 1 to about 200.

In accordance with one embodiment, the ferrocene-containing conductive polymer comprises fluorenyl repetition units, thienyl repetition units, and diallylferrocenyl repetition units. The diallyferrocenyl repetition unit is the portion of the molecule where the oxidation-reduction memory properties are found. The thienyl repetition unit has excellent electron mobility. It is assumed that the fluorenyl repetition unit improves the quality of the thin film formed when the ferrocene-containing conductive polymer is used for the formation of the redox promoter layer. The ferrocene-containing conductive polymer compounds may be further used as a second electro-chromophore compound, depending upon the chemical structure of the compound and the color change which result from oxidation of the compound.

As represented in Chemical Formula 1, an aromatic ring of the fluorenyl repetition unit, the thienyl repetition unit, and the diallylferrocenyl repetition unit can each have one or more substituents. Such substituents, $R_1$ through $R_{12}$, are equal to or different from one another, and suitable examples of these substituents include, but are not limited to the group consisting of: an alkyl group of $C_1$-$C_{20}$; an alkoxy group of $C_1$-$C_{20}$; a cycloalkyl group of $C_3$-$C_{20}$; a heterocycloalkyl group of $C_3$-$C_{20}$; an allyl group of $C_5$-$C_{30}$; a heteroallyl group of $C_5$-$C_{30}$; an allylalkyl group of $C_7$-$C_{30}$; and an allyloxyl group of $C_5$-$C_{30}$.

Specific examples of an alkyl group may include methyl, ethyl, propyl, isobutyl, sec-butyl, tert-butyl, pentyl, iso-amyl, and hexyl, in a straight type or a branch type.

The cycloalkyl group refers to a single valued monocyclic system having the number of C in the range of about 3 to about 20. At least one H atom of the cycloalkyl group can be substituted.

The heterocycloalkyl group refers to a single valued monocyclic system which includes one, two, or three hetero atoms selected from the group consisting of N, O, P and S, and the other ring atoms of C in the range of about 3 to about 20. At least one H atom of the heterocycloalkyl group can be substituted.

The allyl group used in the present invention refers to a carbocycle aromatic system, which includes one or more aromatic rings, wherein the rings can be adhered or fused with one another by a pendant method. Suitable examples of the allyl group include aromatic groups such as phenyl, naphtyl, and tetrahydronaphtyl. At least one H atom of the allyl group can be substituted.

The heteroallyl group used in the present invention refers to a ring aromatic system which includes one, two, or three hetero atoms selected from the group consisting of N, O, P, and S, and the other ring atoms of C in the range of about 5 to about 30, wherein the rings can be adhered or fused with one another by the pendant method. At least one H atom of the heterocycloalkyl group can be substituted.

The allylalkyl group refers to the substitution of a portion of the H atoms in the allyl group for a low-grade alkyl, for example, a radical such as methyl, ethyl, and propyl. Examples of the allylalkyl group include benzyl and phenylethyl. At least one H atom of the allyalkyl group can be substituted.

An example of the conductive polymer compound expressed by the chemical formula 1 includes a conductive polymer compound represented by the following Chemical Formula 2.

[Chemical Formula 2]

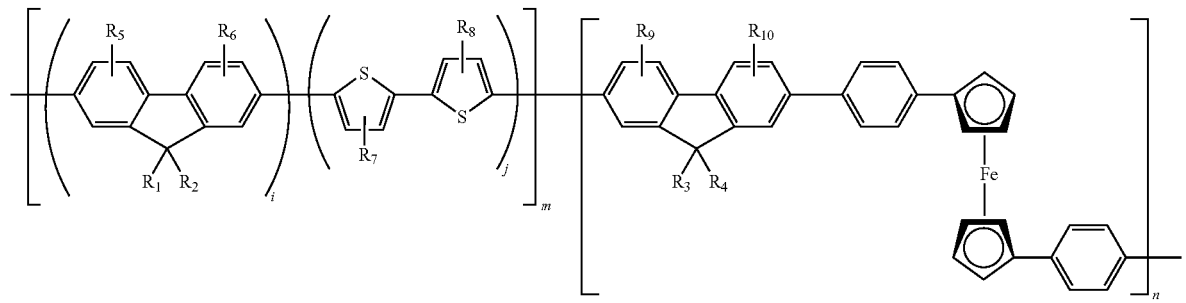

In the above Chemical Formula 2, $R_1$, $R_2$, $R_3$, $R_4$, $R_5$, $R_6$, $R_7$, $R_8$, $R_9$, and $R_{10}$ are equal to or different from one another, and are respectively: H; an alkyl group having the number of C atoms in the range of about 1 to about 20; an alkoxy group having the number of C atoms in the range of about 1 to about 20; a cycloalkyl group having the number of C atoms in the range of about 3 to about 20; a heterocycloalkyl group having the number of C atoms in the range of about 3 to about 20; an allyl group having the number of C atoms in the range of about 5 to about 30; a heteroallyl group having the number of C atoms in the range of about 5 to about 36; an allylalkyl group having the number of C atoms in the range of about 7 to about 30; or an allyloxyl group having the number of C atoms in the range of about 5 to about 30. Further, i and j are equal to or different from each other and are not zero, wherein i is an integer between 0 and about 30, and j is an integer between 0 and about 30; l is a natural number between 1 and about 30, m and n are equal to or different from each other and are not zero, wherein m is an integer between 0 and about 200, and n is an integer between 1 and about 200.

Another example of the conductive polymer compound expressed by the Chemical Formula 1 includes a conductive polymer compound expressed by either the following Chemical Formula 3 or the following Chemical Formula 4.

allyl group is reacted with an oganoboronic acid and a halide in the presence of the palladium catalyst, a Suzuki coupling reaction occurs. Polymerization takes place as a result of the cross-coupling between the oganoboronic acid and the halide, resulting in the generation of a polymer. At this time, since several monomers are co-injected, random copolymerization occurs and the ferrocene group is randomly and statistically inserted between fluorene.

In another embodiment, as an alternative to Suzuki coupling, other palladium reactions may be used to prepare the ferrocene-containing polymer. Examples of other palladium-catalyzed coupling reactions that may be used include Stili reactions (coupling between halide and alkyltin), Yamamoto reactions (reaction between halides), and Sonogasiro reactions (coupling between halide and alkyne).

Hereinafter, exemplary embodiments of the present invention will be described in more detail with reference to the following examples. However, these examples are merely set

[Chemical Formula 3]

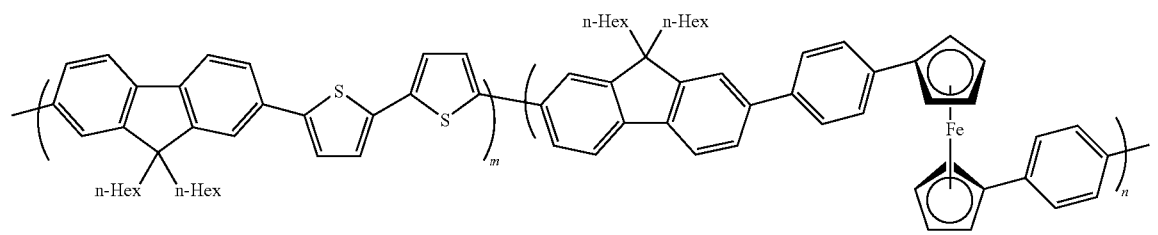

[Chemical Formula 4]

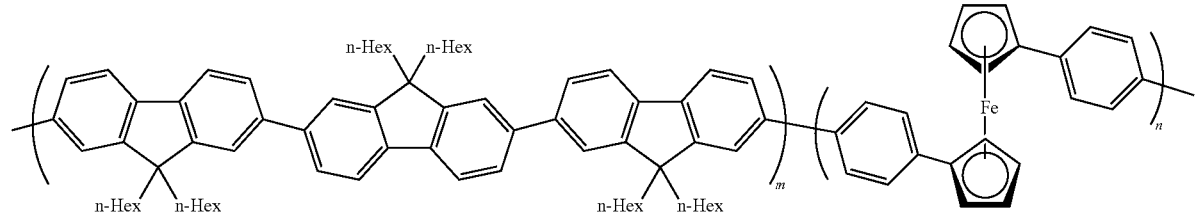

In Chemical Formulas 3 and 4, m and n are equal to or different from each other and are not zero, wherein m is an integer between 0 and about 200, and n is an integer between about 1 and about 200.

In one embodiment, a method is provided for the synthesis of the ferrocene-containing conductive polymer. Following the addition of at least one diallylferrocenyl repetition unit, at least one thienyl repetition unit, and at least one fluorenyl repetition unit to a reaction receptacle, tetrakis(triphenylphosphine)palladium is added as a catalyst. A solvent and the base tetraethylammoniumhydroxide, are subsequently injected into the receptacle, and the constituents are reacted with one another at 110° C. to undergo synthesis. When an forth to illustrate the invention, and thus are not to be construed as limiting the scope of the present invention.

EXAMPLES

Synthesis Example 1

Figure 4:
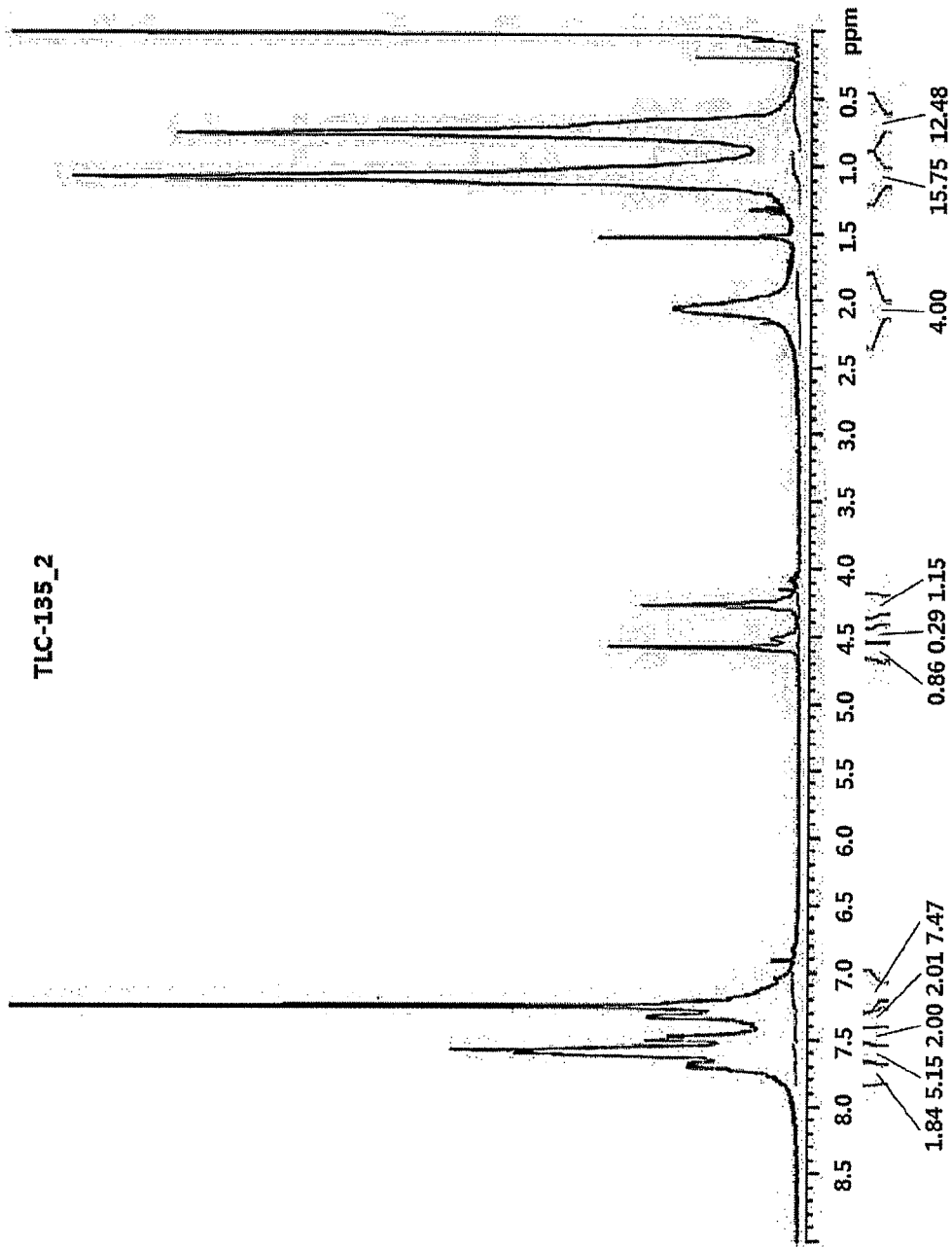
FIG. 4 illustrates the result of $^1$H NMR of ferrocene-containing conductive polymer compound obtained by a synthesis example 1.

The compounds 11'-bis(p-bromophenyl) ferrocene (74 mg, 0.15 mmol), 5,5'-dibromo-2,2-bithiophene (146 mg, 0.45 mmol), 9,9-di(2'-ethylhexyl)fluorene-2,7-diboronic acid (253 mg, 0.6 mmol) and tetrakis(triphenylphosphine)palladium (14 mg, 2 mol %) were added to a flask. After a reflux condenser was connected to the flask, a solvent, specifically, 1.0 ml (milliliters) of toluene and a base, specifically, 3.0 ml of tetraethylammonium hydroxide (1.33M), were injected using a syringe under an $N_2$ atmosphere. Gas was removed from the reaction solution using $N_2$ gas and the flask was then refluxed using an oil double boiler. Following the reaction, the solution was further reacted for an additional four days, at which time the reaction solution was diluted by 20 ml of dichloromethane and then neutralized by an ammonium chloride saturated aqueous solution. The solutions were poured into a fractional funnel and then underwent layer separation to separate out the organic layer. After water was removed using anhydrous magnesium sulfate, the solution was filtered using a glass filter in order to obtain a clean solution. The resulting polymer solution was subsequently decompressed to remove the solvent. The highly concentrated polymer solution was dropped into methanol, accompanied by rapid mixing. The resulting precipitate was extracted, thereby obtaining a solid. The solid was filtered and cleaned by methanol to obtain a solid state ferrocene-containing polymer (288 mg) of the chemical formula 3. The $^1$H NMR result of the obtained ferrocene-containing polymer compound is shown in FIG. 4.

Synthesis Example 2

Figure 5:
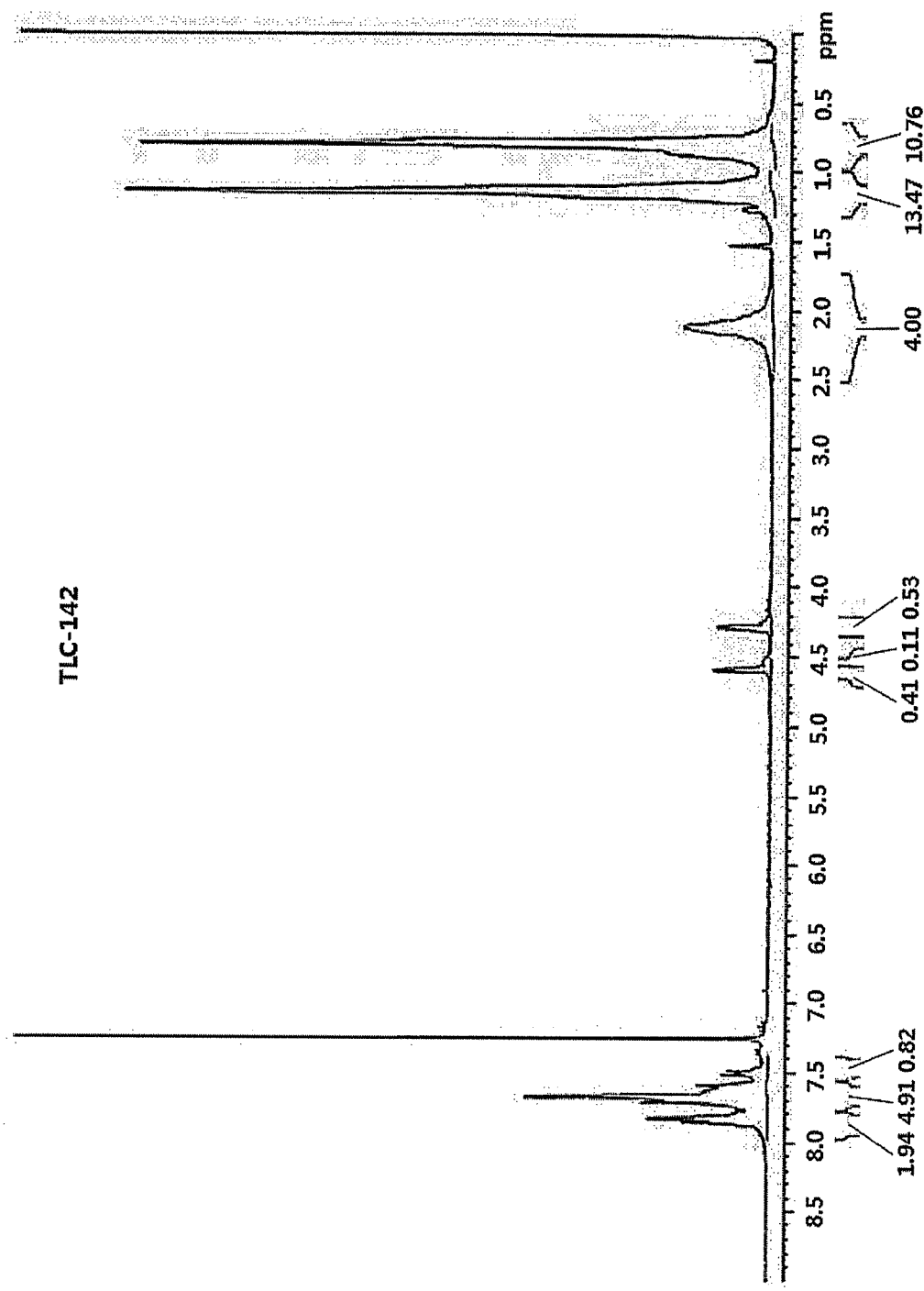
FIG. 5 illustrates the result of $^1$H NMR of ferrocene-containing conductive polymer compound obtained by a synthesis example 2.

The same reaction was performed as outlined in Synthesis Example 1 was performed with the exception of changes to the starting compounds. The compounds 11'-bis(p-bromophenyl)ferrocene (62 mg, 0.125 mmol), 9,9-dihexyl-2,7-dibromofluorene (185 mg, 0.375 mmol), 9,9-di(2'-ethyl-hexyl)fluorene-2,7-diboronic acid (211 mg, 0.5 mmol), and tetrakis(triphenylphosphine)palladium (12 mg, 2 mol %) were added to a flask. The resulting product was a solid state orange colored ferrocene-containing conductive polymer (303 mg) of the chemical formula 4. The $^1$H NMR result of the obtained ferrocene-containing conductive polymer compound is shown in FIG. 5.

In addition, a conductive compound represented by either the following Chemical Formula 5 or Chemical Formula 6 may be used as the conductive p-type redox promoter compound. The following compounds have a conjugated structure.

[Chemical Formula 5]

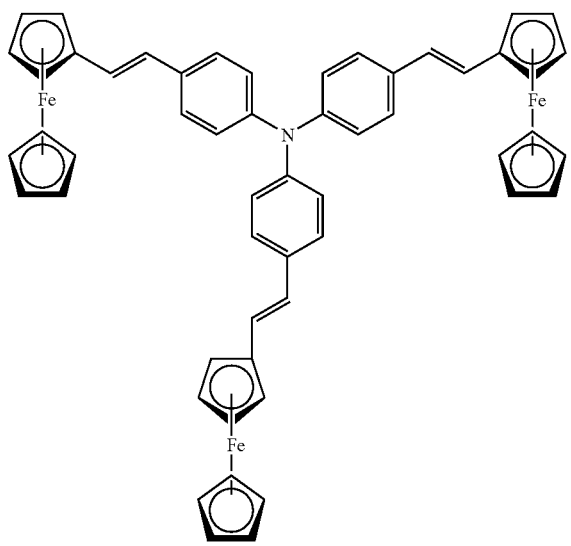

[Chemical Formula 6]

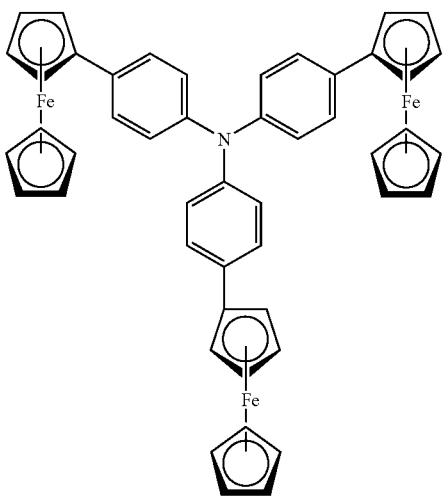

In one embodiment, the conductive compounds described above can be coated as the redox promoter layer, in particular, the anode electrode. In addition to the above described compounds, compounds having a carboxylic group, salicylic group, and ethylphosphate group at the end may be used. The compounds described herein may be applied by spin coating, ink-jet printing, roll coating, doctor blading, spray coating, and the like.

In another embodiment, the electrolytic layer 150 includes a dispersion media (solvent) and an electrolytic compound. The electrolytic layer 150 may have a liquid type, a melting base type, and a solid type. The electrolytic layer 150 is comprised of an electrolyte, which includes at least one electrochemically inert base. Suitable examples of electrolytes for use in the electrolytic layer 150, include one or more mixtures of an electrolyte selected from the group consisting of a Li base such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (x and y are natural numbers), LiCl, and LiI; wherein the Li base may be dissolved in a solvent selected from the group consisting of propylene carbonate, methyl propyl carbonate, butylene carbonate, benzonitryl, acetonitryl, tetrahydrofuran, 2-methyltetrahydrofuran, γ-butyrolactone, dioxolane, 4-methyldioxolane, N,N-dimethylformamide, dimethylaceteamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, or dimethylether, imidasolium based melting base or their mixture material; and a combination of one or more of the foregoing solvents.

The inert base, such as the Li base, may exist in the electrolyte preferably at the concentration of about 0.01M to about 1.0M, more preferably at the concentration of about 0.05M to about 0.2M.

Embodiment 1

A $TiO_2$ paste (Solaronix, Ti-Nanoxide HT) comprised of nanocrystals was layered on an ITO glass substrate by a screen printer. A sieve of a mesh size of 86 μm (micrometer) was used. Subsequently, the paste was heated for 20 minutes at 70° C. to evaporate the organic solvent, and then sintered for one hour at 500° C. in the air, to complete the formation of a cathode electrode. Afterwards, a transparent electrode comprising a semiconductor layer, was digested in a viologen aqueous solution (bis-(2-phosphonoethyl)-4,4'-bipyridinium dichloride) aqueous solution having a concentration of about 2 w % for 30 minutes at room temperature followed by washing with 2-prophanol. The transparent electrode was then dried to form an electrochromic single molecular layer on a surface of the $TiO_2$.

In addition, the p-type redox promoter (1 wt %, chloro benzene solvent) of the chemical formula 3 was formed on an ITO glass substrate of a counter electrode and then heated for 2 minutes at 100° C. to complete the counter electrode.

Subsequently, to facilitate electrolyte injection, a fine hole was formed on the surface of the counter electrode using a drill having a diameter of 0.75 mm. The electrolyte was injected in the space between the two electrodes through the hole, thereby manufacturing an electrochromic device. γ(gamma)-butyrolactone containing 0.05 M $LiClO_4$ was used as the electrolytic solution.

Embodiment 2

A transmittive electrochromic device was manufactured in the same manner as Embodiment 1 with the exception that the p-type promoter was not formed, and γ (gamma)-containing 0.05 M $LiClO_4$ and 0.05 M ferrocene was used as the electrolytic solution.

Embodiment 1 demonstrates an electrochromic effect possessing coloring properties with a response time of 1 second(s), and bleaching properties with a response time of 3 s, at a driving voltage of 1.2 V. Further, Embodiment 1 also appears to possess memory properties of 5 minutes, even after the removal of the power supply.

Embodiment 2 demonstrates driving properties similar to Embodiment 1, wherein Embodiment 2 demonstrates an electrochromic effect possessing coloring properties with a response time of 1 s, and bleaching properties with a response time of 2 s, at a driving voltage of 1.2 V. However, the Embodiment 2 does not possess memory properties as the electrochromic effect is immediately lost upon removal of the power supply.

Although a description of driving has been omitted in the present invention, various driving modes can be used depending on electrode patterns, image display types, and the like.

As described herein, it is possible to use simplified manufacturing process steps to create an electrochromic display device comprising excellent memory properties and an excellent response speed.

Further, since the p-type redox promoter of the counter electrode can be formed easily by spin-coating and printing, the manufacturing process steps can not only be simplified, but the manufacturing cost can also be reduced.

In addition, since it is easy to control the surface properties of the transparent electrode and the p-type redox promoter layer during the introduction of the flexible transparent electrode, it is expected that the driving properties of the flexible electrochromic display device could be improved.

Although the preferred embodiments of the present invention have been disclosed for illustrative purposed, the present invention is not limited hereto. Instead, those skilled in the art will appreciate that various modification, addition, or substitutions are possible without departing from the scope, principles, and spirit of the invention as disclosed and claimed in the accompanying claims.

What is claimed is:

1. An electrochromic display device comprising:
a pair of transparent substrates facing each other;
an anode electrode and a cathode electrode respectively formed on the transparent substrates;
an electrolytic layer disposed between the anode electrode and the cathode electrode;
an electrochromophore layer coated on the cathode electrode; and
a p-type redox promoter layer formed on the anode electrode, the p-type redox promoter layer comprising a conductive polymer.

2. The electrochromic display device of claim 1, wherein the transparent substrates are flexible.

3. The electrochromic display device of claim 1, wherein the cathode electrode comprises a nanocrystal layer and the electrochromophore layer formed thereon,
wherein the nanocrystal layer comprises a plurality of nanocrystal particles layered on the cathode electrode such that a thin film is formed; and
wherein the electrochromophore layer is adsorbed onto the nanocrystal particles.

4. The electrochromic display device of claim 3, wherein the electrochromophore layer comprises an n-type oxidation-reduction chromophore compound.

5. The electrochromic display device of claim 4, wherein the n-type oxidation-reduction chromophore compound is a viologen based compound.

6. The electrochromic display device of claim 3, wherein the nanocrystal particles comprise $TiO_2$.

7. The electrochromic display device of claim 1, wherein the anode electrode and the cathode electrode comprise a conductive compound, and wherein the conductive compound is a conductive polymer.

8. The electrochromic display device of claim 1, wherein the conductive polymer comprises a ferrocene-containing conductive polymer compound.

9. The electrochromic display device of claim 8, wherein the conductive polymer is formed by a coating method selected from the group consisting of spin-coating, spray coating, electrostatic coating, deep coating, blade coating, roll coating, inkjet printing, and a combination of one or more of the forgoing coating methods.

10. The electrochromic display device of claim 8, wherein the ferrocene-containing conductive polymer compound includes a ferrocenyl repetition unit, a thienyl repetition unit, and a diallylferrocenyl repetition unit.

11. The electrochromic display device of claim 1, wherein the conductive polymer includes a conductive compound; the conductive compound including a polymer compound represented by Chemical Formula 1:

[Chemical Formula 1]

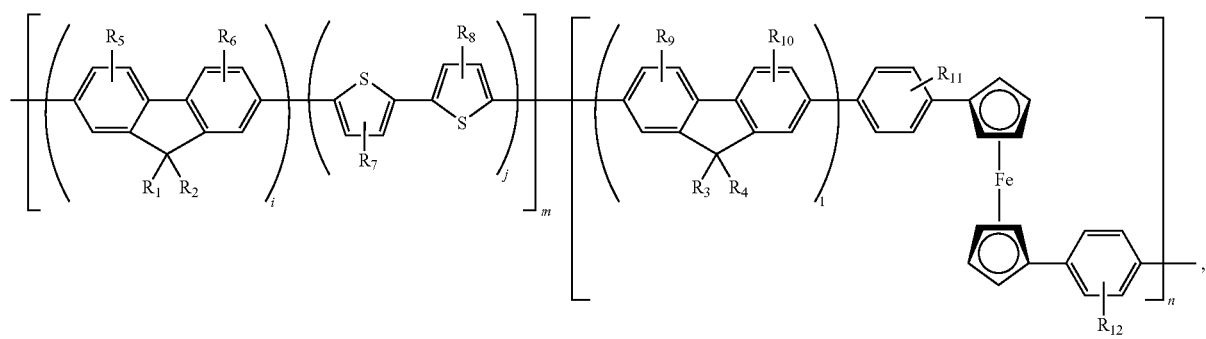

where $R_1, R_2, R_3, R_4, R_5, R_6, R_7, R_8, R_9, R_{10}, R_{11}$ and $R_{12}$ are equal to or different from one another, and are respectively H; an alkyl group having the number of C atoms in the range of about 1 to about 20; an alkoxy group having the number of C atoms in the range of about 1 to about 20; a cycloalkyl group having the number of C atoms in the range of about 3 to about 20; a heterocycloalkyl group having the number of C atoms in the range of about 3 to about 20; an allyl group having the number of C atoms in the range of about 5 to about 30; a heteroallyl group having the number of C atoms in the range of about 5 to about 36; an allylalkyl group having the number of C atoms in the range of about 7 to about 30; or an allyloxyl group having the number of C atoms in the range of about 5 to about 30;

i and j are equal to or different from each other and are not zero, wherein i is an integer between 0 and about 30, j is an integer between 0 and about 30;

l is a natural number between about 1 and about 30; and m and n are equal to or different from each other and are not zero, m is an integer between 0 and about 200, and n is an integer between about 1 and about 200.

12. The electrochromic display device of claim 1, wherein the conductive polymer includes a polymer compound represented by Chemical Formula 2:

where $R_1, R_2, R_3, R_4, R_5, R_6, R_7, R_8, R_9$, and $R_{10}$ are equal to or different from one another, and are respectively H; an alkyl group having the number of C atoms in the range of about 1 to about 20; an alkoxy group having the number of C atoms in the range of about 1 to about 20; a cycloalkyl group having the number of C atoms in the range of about 3 to about 20; a heterocycloalkyl group having the number of C atoms in the range of about 3 to about 20; an allyl group having the number of C atoms in the range of about 5 to about 30; a heteroallyl group having the number of C atoms in the range of about 5 to about 36; an allylalkyl group having the number of C atoms in the range of about 7 to about 30; or an allyloxyl group having the number of C atoms in the range of about 5 to about 30;

wherein i and j are equal to or different from each other and are not zero, i is an integer between 0 and about 30, j is an integer between 0 and about 30;

wherein l is a natural number between about 1 and about 30; and wherein m and n are equal to or different from each other and are not zero, m is an integer between 0 and about 200, and n is an integer between about 1 and about 200.

13. The electrochromic display device of claim 1, wherein the conductive polymer includes a polymer compound represented by Chemical Formula 3 and Chemical Formula 4:

[Chemical Formula 2]

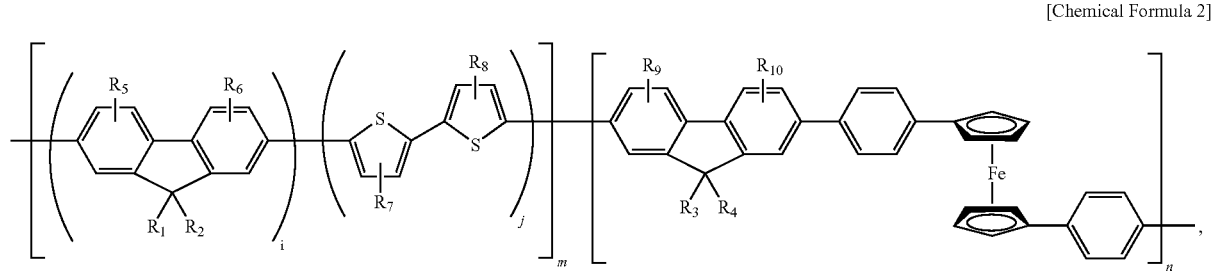

[Chemical Formula 3]

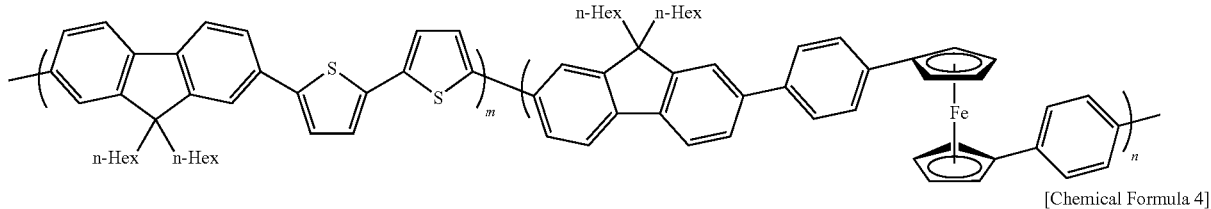

[Chemical Formula 4]

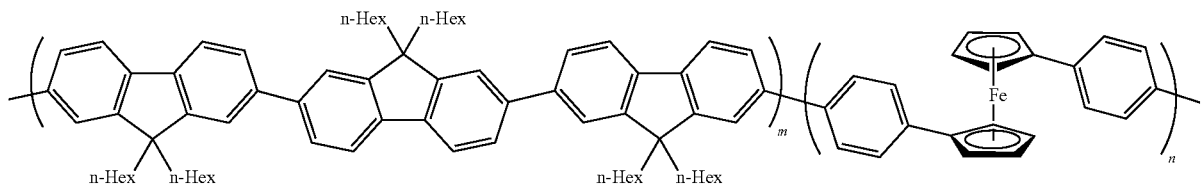

wherein m and n are equal to or different from each other and are not zero, m is an integer between 0 and about 200, and n is an integer between about 1 and about 200.

14. The electrochromic display device of claim 1, wherein the anode electrode and/or the cathode electrode comprises a conductive compound that includes at least one ferrocene-containing compound represented by Chemical Formula 5 or Chemical Formula 6:

[Chemical Formula 5]

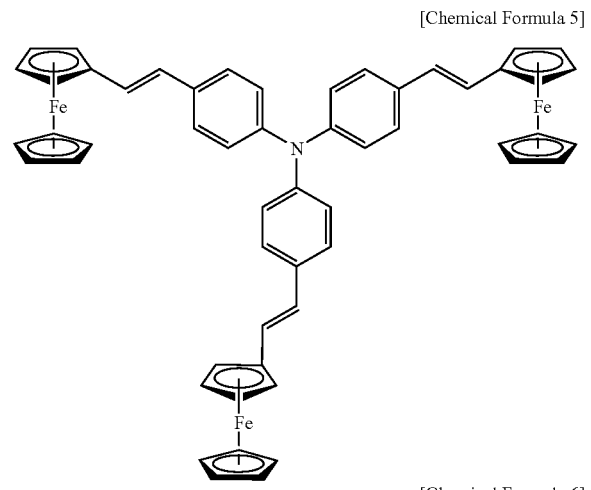

[Chemical Formula 6]

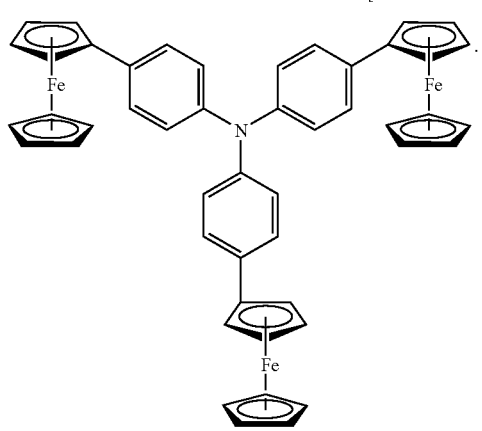

15. The electrochromic display device of claim 1, wherein the anode electrode and/or the cathode electrode comprises a conductive compound that comprises a functional group at the end of the molecule wherein the functional group is selected from one or more of groups consisting of a carboxylic group, a salicylic group, an ethylphosphate group, and a combination of one or more of the foregoing functional groups.

16. The electrochromic display device of claim 1, wherein the electrochromophore layer has a thickness of about 0.1 μm to about 10 μm.

17. A method for manufacturing an electrochromic display device comprising:
   disposing a pair of transparent substrates to face each other;
   forming an anode electrode and a cathode electrode on the transparent substrates;
   disposing an electrolytic layer between the anode electrode and the cathode electrode; and
   forming a p-type redox promoter layer on the anode electrode, the p-type redox promoter layer comprising a conductive polymer.

18. The method of claim 17, wherein the conductive polymer is formed by a coating method selected from the group consisting of spin-coating, spray coating, electrostatic coating, deep coating, blade coating, roll coating, inkjet printing, and a combination of one or more of the forgoing coating methods.

19. The method of claim 17, wherein the cathode electrode comprises a nanocrystal layer and an electrochromophore layer formed thereon,
   wherein the nanocrystal layer comprises a plurality of nanocrystal particles layered on the cathode electrode such that a thin film is formed; and
   wherein the electro-chromophore layer is adsorbed onto the nanocrystal particles.

20. The method of claim 17, wherein a ferrocene-containing conductive polymer compound is used as an electrochromophore compound in the p-type redox promoter layer.

* * * * *